United States Patent [19]
Van Vooren et al.

[11] Patent Number: 5,324,060
[45] Date of Patent: Jun. 28, 1994

[54] WHEELCHAIR CYCLE APPARATUS

[75] Inventors: Charles R. Van Vooren, 2409 Adrian St., Turlock, Calif. 95382; Leslie W. Austin, 540 Strathaven Ct., Turlock, Calif. 95382

[73] Assignees: Charles R. Van Vooren; Leslie W. Austin, Turlock, Calif.

[21] Appl. No.: 974,070

[22] Filed: Nov. 10, 1992

[51] Int. Cl.⁵ .............................................. B62M 1/02
[52] U.S. Cl. ........................... 280/304.1; 297/DIG. 4; 482/60
[58] Field of Search ............... 280/304.1, 250.1, 233, 280/288.4; 297/DIG. 4; 482/61, 60, 57

[56] References Cited
U.S. PATENT DOCUMENTS

| | | | |
|---|---|---|---|
| 3,423,086 | 1/1969 | Moore | 280/304.1 |
| 4,316,616 | 2/1982 | Boivin | 280/304.1 |
| 4,471,972 | 9/1984 | Young | 280/304.1 |
| 4,483,548 | 11/1984 | Zirrilo | 280/304.1 |
| 4,572,501 | 2/1986 | Durham et al. | 280/250.1 |
| 4,720,117 | 1/1988 | Hay | 280/304.1 |
| 4,767,130 | 8/1988 | Fu-Chao | 280/250.1 |
| 4,770,431 | 9/1988 | Kulik | 280/304.1 |
| 4,789,175 | 12/1988 | Schramm | 280/304.1 |
| 4,824,132 | 4/1989 | Moore | 280/304.1 |
| 4,830,388 | 5/1989 | Wang | 280/304.1 |
| 5,066,032 | 11/1991 | Van Vooren et al. | 280/304.1 |
| 5,207,286 | 5/1993 | McKelvey | 280/304.1 |

Primary Examiner—Margaret A. Focarino
Assistant Examiner—Kevin Hurley

[57] ABSTRACT

A wheelchair cycle apparatus that includes a frame to which is attached a connecting device for connecting the frame to a wheelchair. A drive wheel and driven wheel are attached to the frame. A pair of pedals are attached to either the drive wheel or the driven wheel depending upon whether the user can move his/her own legs. A chain connects the drive wheel to the driven wheel. The wheelchair cycle apparatus may be connected to the frame of a wheelchair to produce a wheelchair assembly that enables a disabled individual to exercise his/her own legs while seated in the wheelchair.

15 Claims, 4 Drawing Sheets

WHEELCHAIR CYCLE APPARATUS

BACKGROUND OF THE INVENTION

The present invention relates to apparatus for modifying a wheelchair, and to wheelchair assemblies that have been modified with such apparatus. In particular, the present invention relates to apparatus for modifying a wheelchair that enables a disabled individual to exercise his/her legs while in the wheelchair.

The legs of disabled individuals, who are wheelchair confined, may have varying degrees of infirmity. The disabled individual may or may not be able to move his legs. In either instance, however, it is desirable to exercise the legs to stimulate the leg muscles, preventing atrophy of those muscles.

There is a need for an improved apparatus for modifying a wheelchair such that, when attached to a wheelchair, it enables the disabled individual to exercise his/her legs while in the wheelchair.

There is a need for such an apparatus that can be used by wheelchair confined individuals to exercise their legs irrespective of the degree to which such individuals may control movement of their legs, if at all.

There is a needs for such an apparatus that provides a stable, user friendly, structure when attached to a wheelchair.

The wheelchair cycle apparatus of the present invention provides such an apparatus.

SUMMARY OF THE INVENTION

The present invention provides a wheelchair cycle apparatus, which comprises:
  a frame;
  a first connecting device attached to the frame for connecting the frame to a wheelchair;
  a drive wheel engaged with the frame;
  a driven wheel engaged with the frame;
  at least one pedal connected to at least one of the drive and driven wheels;
  a band connecting the drive wheel to the driven wheel;
  a stabilizing member attached to the frame for connection to a wheelchair; and
  a second connecting device attached to the stabilizing member for connecting the stabilizing member to a wheelchair.

The wheelchair cycle apparatus of the present invention may be connected to a wheelchair to make a wheelchair assembly comprising a combination of those two components.

Figure 1:
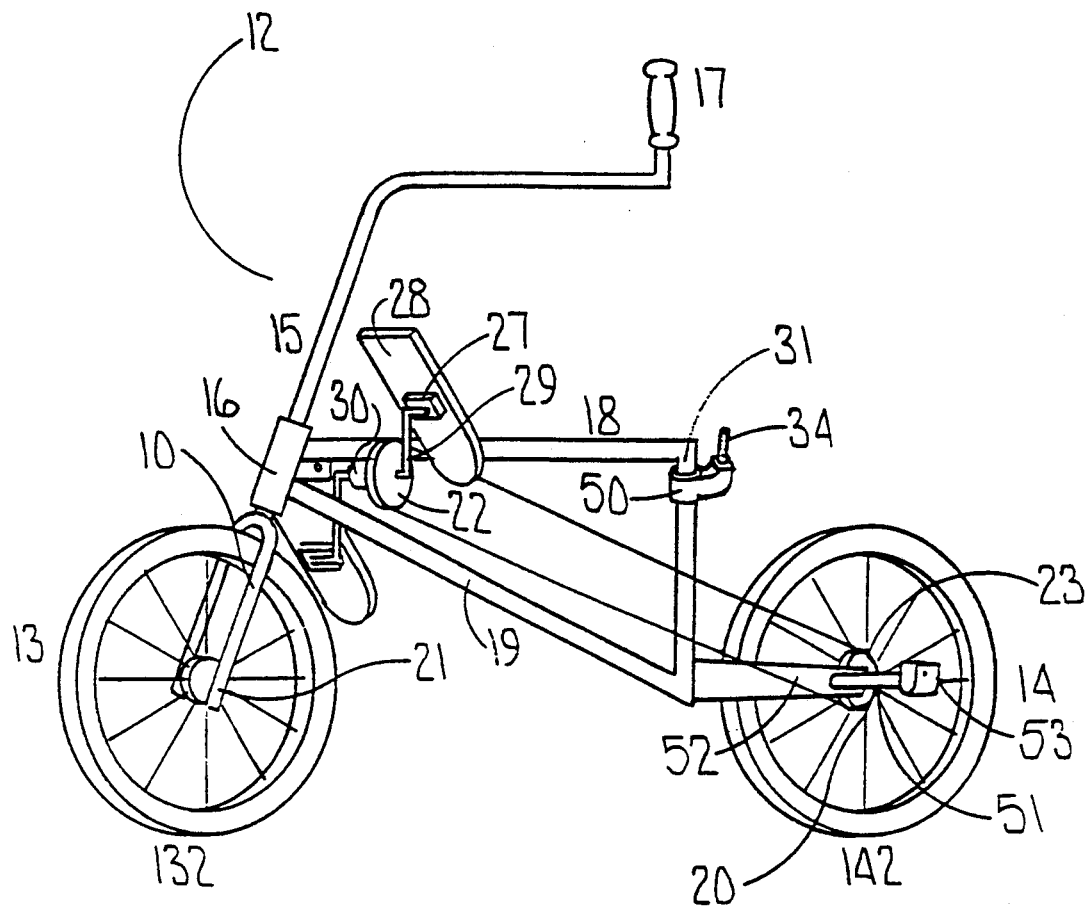
FIG. 1 is a side view of one embodiment of the wheelchair cycle apparatus of the present invention.

DETAILED DESCRIPTION OF SPECIFIC EMBODIMENTS:

This invention is a novel wheelchair cycle apparatus and wheelchair assembly that includes such an apparatus as a component. The wheelchair cycle apparatus includes: a frame; a first connecting device attached to the frame for connecting the frame to a wheelchair; a drive wheel engaged with the frame; a driven wheel engaged with the frame; at least one pedal connected to at least one of the drive and driven wheels; a band connecting the drive wheel to the driven wheel; a stabilizing member attached to the frame for connection to a wheelchair; and a second connecting device attached to the stabilizing member for connecting the stabilizing member to a wheelchair.

The frame's configuration, shape and size should be selected to ensure that it is connectable to a wheelchair and to ensure that it may support the other components of the wheelchair cycle apparatus so that those other components may carry out their function of permitting a disabled individual to exercise his/her legs while confined to the wheelchair.

The first connecting device may be any device capable of joining the wheelchair cycle apparatus to a wheelchair so that the resulting wheelchair assembly obtains a balanced, sturdy configuration consistent with its intended use.

The drive wheel engaged to the frame may be of varying dimension and shape so long as it fulfills the function of turning in response to an external force to drive the band to which it is connected. Such a drive wheel may, for example, be a sprocket that drives a chain that is connected to the sprocket. Alternatively, such a drive wheel may include a recessed groove for connection to a belt or cable that may drive the belt or cable in response to such an external force.

The driven wheel engaged to the frame may likewise be of varying dimension and shape, so long as it fulfills the function of turning in response to movement of the drive wheel.

The driven wheel preferably has a diameter that is smaller than the diameter of the drive wheel, which enables a shorter rotation of the drive wheel to translate to a longer rotation of the driven wheel.

The pedal may be of any shape or size so long as it may attach to, or engage, the disabled individual's foot (or leg in the case of an amputee) and also attach to the drive wheel or the driven wheel. There are preferably two pedals, one for each foot or leg.

Whether the pedal is attached to the drive wheel or the driven wheel depends upon whether the disabled individual may move his/her own legs. If the disabled individual can move his/her own legs to generate sufficient force to rotate the drive wheel, then the pedal is attached to the drive wheel. If the disabled individual cannot use his/her own legs to rotate the drive wheel, then the pedal is attached to the driven wheel.

In the first instance, the disabled individual exercises his/her own legs by turning the pedals with his/her own legs. In the second instance, the disabled individual's legs are exercised by applying an external force to the drive wheel. The drive wheel then turns the band, rotating the driven wheel. The driven wheel, in turn, rotates the pedals so that the feet or legs connected to them are exercised.

The band connecting the drive wheel to the driven wheel may be any belt, chain, cable or linking member that may transfer the rotational force of the drive wheel to the driven wheel to cause the driven wheel to rotate. When the drive and driven wheels are a pair of sprockets, the band preferably is a chain that is connected to the sprockets via the chain's engagement with the sprockets' teeth.

The stabilizing member is attached to the frame, preferably at the end opposite from where the pedal or pedals are attached. The stabilizing member may consist of one or more rods, bars, plates, or other extensions of sufficient length to engage the frame with the lower frame rails of a wheelchair.

The second connecting member, which is attached to the stabilizing member, may be any device (or combination) capable of joining the stabilizing member to a lower frame rail of a wheelchair. Such a connecting device may include, for example, a "U" bracket that may fit beneath the wheelchair's lower frame rail. Such a "U" bracket may be secured to the rail with a pin, clip, or bolt, for example. Alternatively, such a connecting member may comprise any number of bolts, clips, pins, or other devices capable of connecting the stabilizing member to a wheelchair's lower frame rail.

FIG. 1 shows a side view of an embodiment of the wheelchair cycle apparatus of the present invention. That embodiment may be used to exercise the legs of disabled individuals who have sufficient leg strength to turn the drive wheel with their own legs.

The embodiment of the wheelchair cycle apparatus 12 shown in FIG. 1 is somewhat like a modified bicycle. It includes a forward bicycle wheel 13 and a rear bicycle wheel 14, each including a respective bottom contact 13a and 14a. Wheelchairs vary in size. The dimensions of wheels 13 and 14 will likewise vary in size so that they may accomodate different-sized wheelchairs. For example, wheelchairs having 12 inch wheels preferably will have wheels 13 and 14 of about 6 inch diameter. For 24 inch wheeled wheelchairs, the diameters of wheels 13 and 14 should be about 12 inches. For wheelchairs having 32 inch wheels, the diameters of wheels 13 and 14 should be about 16 inches. Thus, the diameter of wheels 13 and 14 preferably ranges from 6 inches to 16 inches depending upon the diameter of the wheels of the wheelchair to which the wheelchair cycle apparatus 12 is to be connected.

The forward wheel 13 includes a forward axle 21 rotatably mounting the forward wheel 13. Frame neck tube 16 slidably and rotatably receives the forward wheel support tube 15, terminating at one end with a handle bar member 17 and at the other end with forks 10, which attach to forward axle 21.

The wheelchair cycle apparatus 12 further includes horizontal bar 18 and vertical bar 11, which is connected to frame bar 19. The frame bar 19 and the horizontal bar 18 are attached to frame neck tube 16.

Drive sprocket 22 is mounted to crank 30, which engages horizontal bar 18. Drive sprocket 22 receives the links of an endless drive chain 24, which likewise engages driven sprocket 23. Driven sprocket 23 is mounted to rear axle 20, effecting rotation of rear wheel 14 in response to the rotation of drive sprocket 22.

Although not shown in FIG. 1, a drive chain shield may be mounted to the horizontal bar 18 to prevent contact of an upper extent of the drive chain 24 with an occupant of a wheelchair when the wheelchair cycle apparatus 12 is mounted to a wheelchair. A drive pedal 27 is mounted to each of the levers 29. Each drive pedal includes a platform 28. Each platform may include a first and second hook and loop strap member mounted to the platform to fixedly secure each foot of an occupant of the wheelchair to each drive pedal 27.

Encircling vertical bar 11 is mounting boss 31, which consists of a collar 50, having a threaded support boss 34 orthogonally and integrally attached to its upper surface. Collar 50 slides along vertical bar 11 allowing adjustment to accomodate different sized wheelchairs. Collar 50 may be fixed along vertical bar 11 at the appropriate position with one or more set screws or other fastening devices.

The stabilizing member for the embodiment shown in FIG. 1 consists of bar 51, which is connected to frame bar 19 at lower portion 52. Preferably, bar 51 is threaded, enabling it to adjust to different lengths. Such a feature will enable bar 51 to properly engage the lower frame rails of different wheelchairs, irrespective of possible variation in distance between a wheelchair's lower frame rails.

The device for connecting bar 51 to a wheelchair, shown in FIG. 1, is "U" bracket 53. "U" bracket 53 preferably adjusts to accomodate wheelchairs varying in distance between the ground and the lower frame rail. "U" bracket 53 may be threaded, allowing it to move up or down to accomplish that result.

Figure 2:
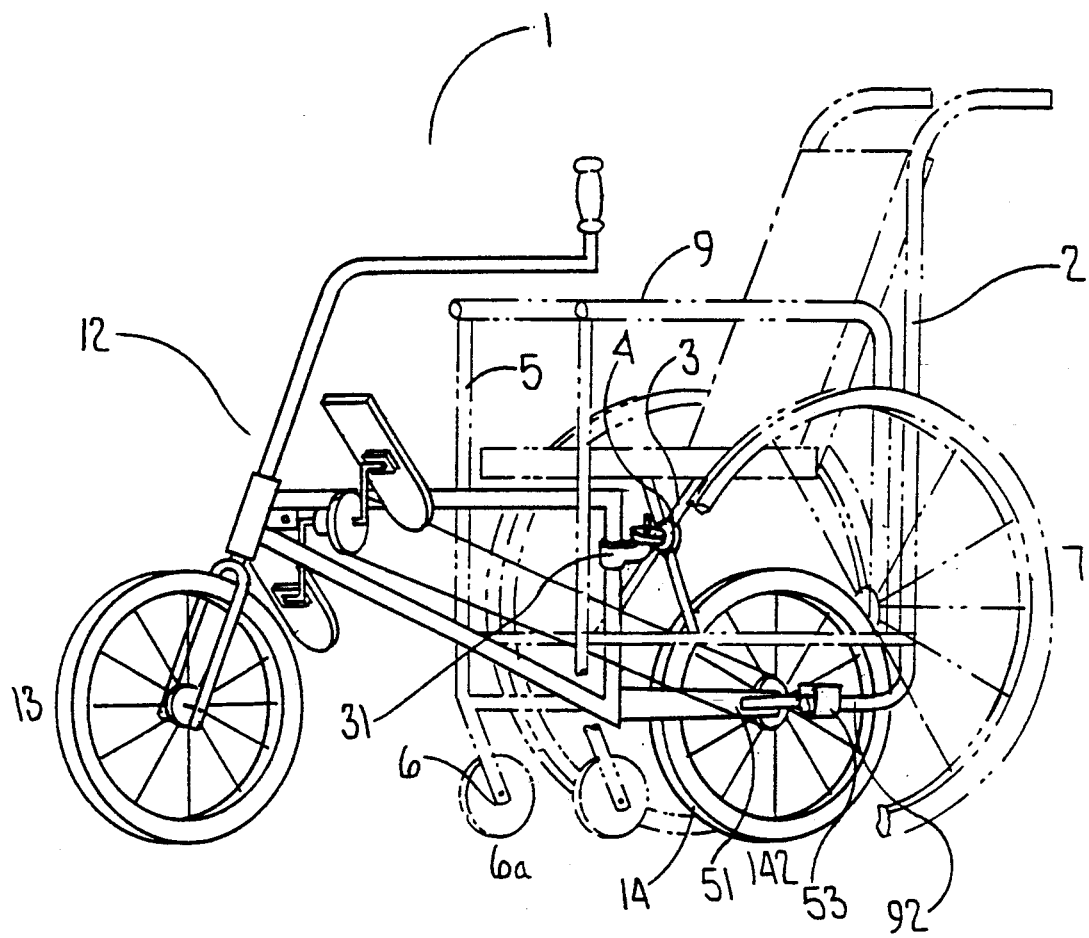
FIG. 2 is a side view of an embodiment of the wheelchair assembly of the present invention in which the embodiment of the wheelchair cycle apparatus shown in FIG. 1 is connected to a wheelchair.

FIG. 2 shows a side view of an embodiment of the wheelchair assembly 1 of the present invention, in which the wheelchair cycle apparatus 12 shown in FIG. 1 is shown connected to the wheelchair 2.

The wheelchair 2 includes a cross brace 3 that mounts a yoke or eye bolt 4, interiorly of the framework of the wheelchair assembly 1 rearwardly of the vertical frame rail 5 and positioned between the upper and lower horizontal frame rails 9 and 9a. Yoke 4 preferably adjusts inward and outward from the position shown in FIG. 2, by threads or other means, to further facilitate accomodation of wheelchair cycle apparatus 12.

Each front wheel assembly 6 includes a front wheel assembly bottom contact surface 6a in association with a support surface defining a first predetermined spacing between the yoke 4 and the front wheel assembly bottom contact surface 6a. A second predetermined spacing is defined between an upper surface of the mounting boss 31 and the rear wheel bottom contact surface 14a, with the second predetermined spacing greater than the first predetermined spacing to lift the front wheel assemblies 6 out of contact with the support surface when the wheelchair 2 is connected to the wheelchair cycle apparatus 12.

The stabilizing member, which is bar 51 in FIG. 2, and the connecting device, which is "U" bracket 53, lift rear wheels 7 up so that they continue to stabilize the combined structure, but without hindrance to its movement. The raised rear wheels 7 thus act like "training wheels" used with a conventional bicycle. Rear wheel 14 acts as a wheelchair supporting wheel that is mounted to the frame.

As shown in FIG. 2, the wheelchair assembly 1 provides a stable structure with rear wheels 7 providing a balancing effect for rear bicycle wheel 14 and front bicycle wheel 13.

Figure 3:
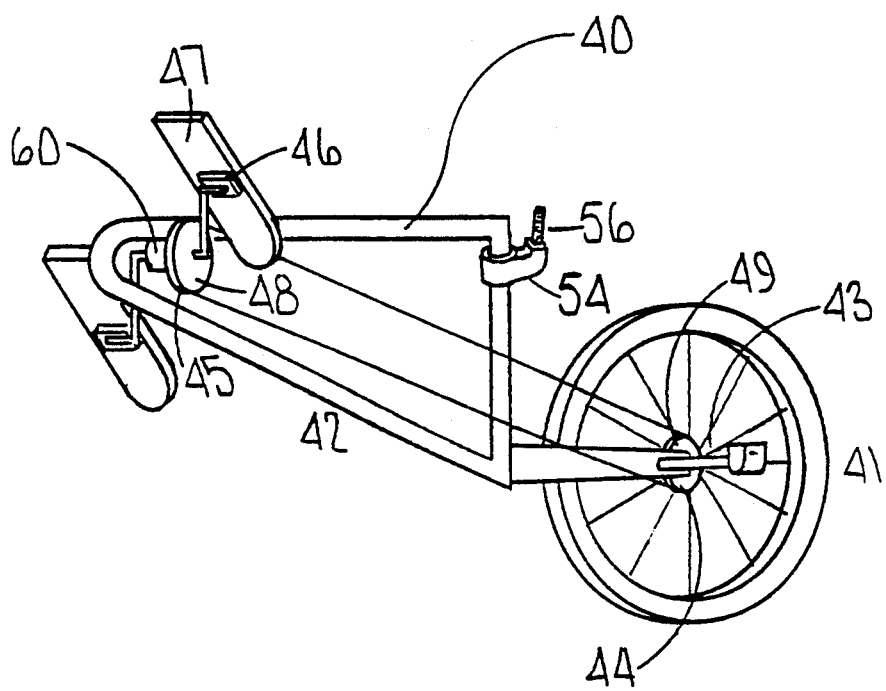
FIG. 3 is a side view of a second embodiment of the wheelchair cycle apparatus of the present invention.

FIG. 3 shows a second embodiment of the wheelchair cycle apparatus of the present invention. That embodiment may be used to exercise the legs of disabled individuals who have little or no ability to move their legs. That second embodiment of the wheelchair cycle apparatus 40 includes a wheelchair supporting wheel 41 mounted to a frame 42. Wheelchair supporting wheel 41 includes hub 43 to which is attached drive sprocket 44.

At the other end of frame 42 is attached driven sprocket 45, which is connected to crank 60. Driven sprocket 45 is attached to pedals 46. Like the embodiment shown in FIG. 1, pedal 46 includes a platform 47. Platform 47 may further include hook and loop strap members to secure the foot of the disabled individual to pedal 46.

Drive chain 61 engages the teeth 48 and 49 of sprockets 44 and 45, respectively, so that sprocket 45 will rotate in response to the rotation of sprocket 44. In the embodiment shown in FIG. 3, hub 43 preferably is a three-speed hub that is attached to wheelchair supporting wheel 41 in the reverse orientation from that of a conventional bicycle wheel. This permits the counter clockwise rotation of the wheel 41 to generate a clockwise rotation of pedal 46.

Figure 4:
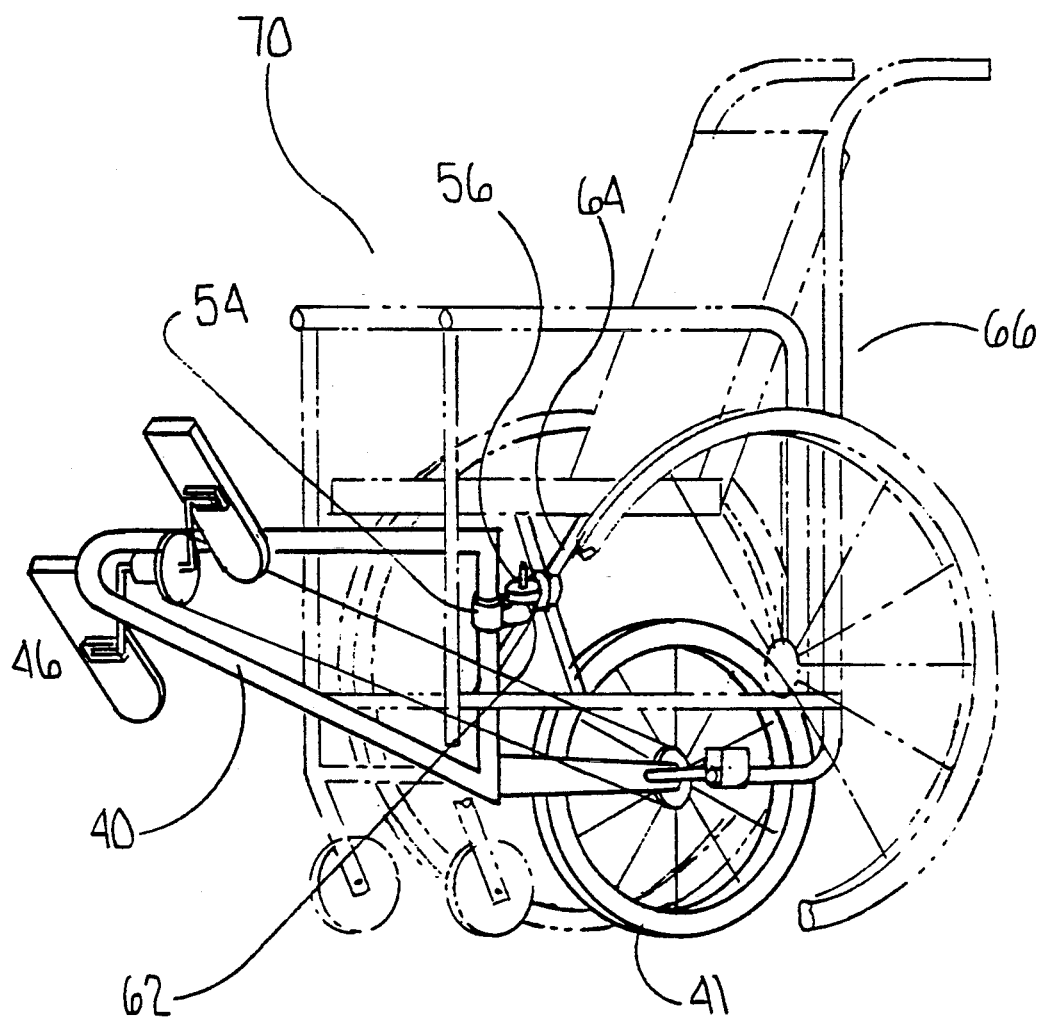
FIG. 4 is a side view of an embodiment of the wheelchair assembly of the present invention in which the embodiment of the wheelchair cycle apparatus shown in FIG. 3 is connected to a wheelchair.

FIG. 4 shows a side view of a second embodiment of the wheelchair assembly 70 of the present invention, in which the wheelchair cycle apparatus 40 shown in FIG. 3 is connected to the wheelchair 66.

In that embodiment, like the embodiment shown in FIG. 2, wheelchair 66 includes a cross brace 64 that mounts eye bolt 62. The wheelchair cycle apparatus 40 is connected to wheelchair 66 by inserting threaded support boss 56, which is attached to mounted boss 54 (attached to frame 42) through eye bolt 62. From FIG. 4 it is apparent how the wheelchair assembly 70 operates to exercise the legs of a disabled individual who cannot move his/her own legs. The reverse orientation of the three-speed hub enables forward movement of the wheel 41 to drive pedal 46, which in turn moves the disabled person's legs. The three-speed feature also permits the assembly to move at three varied speeds, depending on what is therapeutically desirable for the individual. A neutral "gear" may be included to allow the wheelchair to be moved without translating motion from the wheelchair's wheels to the pedals.

The wheel 41 may be manually rotated, such as by an individual pushing the wheelchair assembly 70 from behind. Alternatively, electrical power means can be added to the wheelchair assembly 70, which would enable the disabled individual to operate the wheelchair cycle apparatus by simply flipping an electrical switch or joystick.

While the present invention has been described with respect to a number of specific embodiments, those skilled in the art will appreciate a number of variations and modifications of those embodiments. Thus, it is intended that the appended claims cover all such variations and modifications as fall within the true spirit and scope of the present invention.

What is claimed is:

1. A wheelchair cycle apparatus comprising:
   a frame, comprising a frame bar, a first frame member connected to said frame bar at a first end and connected to a second frame member at a second end, said second frame member being connected at a third end to said frame bar;
   a first connecting device attached to the frame for connecting the frame to a wheelchair;
   a drive wheel engaged with the frame;
   a driven wheel engaged with the frame;
   a wheelchair supporting wheel mounted to the frame;
   a hub having at least three speeds that is engaged with the wheelchair supporting wheel;
   at least one pedal connected to at least one of the drive and driven wheels;
   a band connecting the drive wheel to the driven wheel;
   a stabilizing member attached to the frame for connection to a wheelchair; and
   a second connecting device attached to the stabilizing member for connecting the stabilizing member to a wheelchair.

2. The wheelchair cycle apparatus of claim 1 wherein the first connecting device comprises a mounting boss having a threaded support boss orthogonally and integrally attached to a surface of the mounting boss, the drive wheel comprises a first sprocket, the driven wheel comprises a second spocket, the pedal is connected to the first sprocket, and the band is a chain.

3. The wheelchair cycle apparatus of claim 1 wherein the drive wheel is attached to the wheelchair supporting wheel and the pedal is attached to the driven wheel.

4. The wheelchair cycle apparatus of claim 1 wherein the driven wheel is attached to the wheelchair supporting wheel and the pedal is attached to the drive wheel.

5. A wheelchair assembly comprising:
   a wheelchair connected to:
   a wheelchair cycle apparatus comprising:
   a frame, comprising a frame bar, a first frame member connected to said frame bar at a first end and connected to a second frame member at a second end, said second frame member being connected at a third end to said frame bar;
   a first connecting device attached to the frame for connecting the frame to a wheelchair;
   a drive wheel engaged with the frame;
   a driven wheel engaged with the frame;
   a wheelchair supporting wheel mounted to the frame;
   a hub having at least three speeds that is engaged with the wheelchair supporting wheel;
   at least one pedal connected to at least one of the drive and driven wheels;
   a band connecting the drive wheel to the driven wheel;
   a stabilizing member attached to the frame connecting the frame to the wheelchair; and
   a second connecting device attached to the stabilizing member connecting the stabilizing member to the wheelchair.

6. The wheelchair assembly of claim 5 wherein the wheelchair includes a plurality of rear wheels mounted to the wheelchair and a plurality of front wheels mounted to the wheelchair and wherein the front wheels are elevated above a supporting surface when the rear wheels and wheelchair cycle apparatus contact the supporting surface.

7. The wheelchair assembly of claim 5 wherein the drive wheel is attached to the wheelchair supporting wheel and the pedal is attached to the driven wheel.

8. The wheelchair assembly of claim 5 wherein the driven wheel is attached to the wheelchair supporting wheel and the pedal is attached to the drive wheel.

9. The wheelchair assembly of claim 5 wherein the wheelchair comprises a frame, a plurality of rear wheels mounted to the frame, a plurality of front wheels mounted to the frame, a seat, and a back support; and wherein the seat lies between the back support and the pedal of the wheelchair cycle apparatus.

10. The wheelchair assembly of claim 5 wherein:

the wheelchair comprises a frame, a plurality of rear wheels mounted to the frame, and a plurality of front wheels mounted to the frame;

the frame of the wheelchair cycle apparatus comprises the frame bar, a horizontal frame member connected to said frame bar at a first end and to a vertical frame member at a second end, said vertical frame member being connected at a third end to said frame bar;

the wheelchair supporting wheel is rotatably mounted to a rear end of said frame bar;

the drive wheel is a drive sprocket that is rotatably mounted to the frame;

the driven wheel is a driven sprocket that is rigidly mounted to the wheelchair supporting wheel;

the band is a chain;

the first connecting device is attached to said vertical frame member and includes a vertically extending threaded rod;

the stabilizing member is attached at one end to said frame bar and is releasable attached at another end to said wheelchair; and further comprises a yoke attached to said wheelchair frame, said vertically extending threaded rod being inserted into said yoke.

11. A wheelchair cycle apparatus that consists essentially of:

a frame;

a first connecting device attached to the frame for connecting the frame to a wheelchair;

a wheelchair supporting wheel mounted to the frame;

a drive sprocket attached to the wheelchair supporting wheel;

a driven sprocket attached to the frame;

two pedals attached to the driven sprocket;

a drive chain engaging the drive sprocket and the driven sprocket;

a stabilizing member attached to the frame for connection to a wheelchair; and a second connecting device attached to the stabilizing member for connecting the stabilizing member to a wheelchair.

12. A wheelchair assembly comprising:

a wheelchair connected to:

a wheelchair cycle apparatus comprising:

a frame, comprising a frame bar, a first frame member connected to said frame bar at a first end and connected to a second frame member at a second end, said second frame member being connected at a third end to said frame bar;

a wheelchair supporting wheel mounted to the frame;

a first connecting device attached to the frame for connecting the frame to a wheelchair;

a drive sprocket attached to the wheelchair supporting wheel;

a hub having at least three speeds that is engaged with the wheelchair supporting wheel and the drive sprocket;

a driven sprocket attached to the frame;

at least one pedal attached to the driven sprocket;

a drive chain engaging the drive sprocket with the driven sprocket;

a stabilizing member attached to the frame connecting the frame to the wheelchair; and a second connecting device attached to the stabilizing member connecting the stabilizing member to the wheelchair.

13. The wheelchair assembly of claim 12 wherein the wheelchair includes a plurality of rear wheels mounted to the wheelchair and a plurality of front wheels mounted to the wheelchair such that the front wheels are elevated above a supporting surface when the rear wheels and wheelchair supporting wheel contact the supporting surface; and wherein the wheelchair further includes a frame to which is attached a yoke and the wheelchair cycle apparatus further includes a mounting boss attached to the frame, the mounting boss having a threaded support boss orthogonally and integrally attached to a surface of the mounting boss such that the wheelchair is connected to the wheelchair cycle apparatus via the threaded support boss of the mounting boss being inserted into the yoke of the wheelchair.

14. The wheelchair assembly of claim 12 wherein the wheelchair comprises a frame, a plurality of rear wheels mounted to the frame, a plurality of front wheels mounted to the frame, a seat, and a back support; and wherein the seat lies between the back support and the pedal of the wheelchair cycle apparatus.

15. The wheelchair assembly of claim 12 wherein:

the wheelchair comprises a frame, a plurality of rear wheels mounted to the frame, and a plurality of front wheels mounted to the frame;

the frame of the wheelchair cycle apparatus comprises the frame bar, a horizontal frame member connected to said frame bar at a first end and to a vertical frame member at a second end, said vertical frame member being connected at a third end to said frame bar;

the wheelchair supporting wheel is rotatably mounted to a rear end of said frame bar;

the drive sprocket is rotatably mounted to the frame;

the driven sprocket is rigidly mounted to the wheelchair supporting wheel;

the first connecting device is attached to said vertical frame member and includes a vertically extending threaded rod;

the stabilizing member is attached at one end to said frame bar and is releasable attached at another end to said wheelchair; and further comprises a yoke attached to said wheelchair frame, said vertically extending threaded rod being inserted into said yoke.

* * * * *